(12) United States Patent
Liu et al.

(10) Patent No.: US 11,005,559 B2
(45) Date of Patent: May 11, 2021

(54) REPEATER AND RADIATION PATTERN FORMING METHOD FOR THE SAME

(71) Applicant: WISTRON NEWEB CORPORATION, Hsinchu (TW)

(72) Inventors: Chih-Hsiang Liu, Hsinchu (TW); Tsun-Che Huang, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 54 days.

(21) Appl. No.: 16/699,240

(22) Filed: Nov. 29, 2019

(65) Prior Publication Data

US 2020/0274610 A1 Aug. 27, 2020

Related U.S. Application Data (60) Provisional application No. 62/810,960, filed on Feb. 27, 2019.

(51) Int. Cl.
*H04B 7/14* (2006.01)
*H04B 7/155* (2006.01)
(Continued)

(52) U.S. Cl.
CPC ............ *H04B 7/155* (2013.01); *H01Q 3/34* (2013.01); *H04W 84/047* (2013.01)

(58) Field of Classification Search
CPC ........ H04B 1/005; H04B 1/0064; H04B 3/36; H04B 3/58; H04B 7/02; H04B 7/022;
(Continued)

(56) References Cited

U.S. PATENT DOCUMENTS 6,934,511 B1 * 8/2005 Lovinggood .......... H01Q 1/007
343/702
10,355,770 B2 * 7/2019 Gharavi ................ H01Q 1/246
(Continued)

OTHER PUBLICATIONS

Whitepaper, UE-Side Virtual MIMO Using MM-Wave for 5G, Fraunhofer-Institute for Integr. Circuits (IIS) Communication Systems Division, 20 pages, Aug. 2014.*
Medina-Sanchez, Beam Steering Control System for Low-Cost Phased Array Weather Radars: Design and Calibration Techniques, UMASS, 220 pages, Aug. 2014.*

*Primary Examiner* — Frank Duong
(74) *Attorney, Agent, or Firm* — McClure, Qualey & Rodack, LLP (57) ABSTRACT

A repeater includes an up-link circuit and a down-link circuit. The down-link circuit includes a receiver, a radio frequency circuit and a transmitter. The transmitter transmits the repeated second signals to the user equipment and includes an antenna array, a plurality of power amplifiers, a plurality of first phase shifters, a first memory unit, and a first control logic circuit. The antenna array includes a plurality of antenna elements arranged along a first direction, and the number of the plurality of antenna elements is at least four. The first memory unit is configured to store predetermined parameters associated with a predetermined radiation pattern. The first control logic circuit selects a first number of the power amplifiers and the first number of the first phase shifters, and sets normalized gains for the selected plurality of power amplifiers range from 0.7 to 1 unit.

19 Claims, 9 Drawing Sheets

(51) Int. Cl.
*H01Q 3/34* (2006.01)
*H04W 84/04* (2009.01)

(58) Field of Classification Search
CPC . H04B 7/04; H04B 7/14; H04B 7/155; H04B 7/15507; H04B 7/15528; H04B 7/15535; H04B 7/1555; H04B 7/204; H04B 10/29; H04B 10/2937; H04B 10/298; H04B 17/40; H01Q 3/34; H01Q 2213/13191; H01Q 2213/191; H04W 40/22; H04W 52/46; H04W 84/047; H04W 88/00; H04W 88/04; H04J 1/10; H04L 5/14; H04L 25/20; H04L 25/40

See application file for complete search history.

(56) References Cited

U.S. PATENT DOCUMENTS

| | | | | |
|---|---|---|---|---|
| 10,484,078 | B2* | 11/2019 | Gharavi | H04B 7/165 |
| 10,523,160 | B2* | 12/2019 | Ashworth | H03F 3/72 |
| 10,700,766 | B2* | 6/2020 | Khandani | H04B 7/15535 |
| 10,784,952 | B2* | 9/2020 | Huang | H04B 7/15535 |
| 10,840,997 | B2* | 11/2020 | Cheng | H04B 7/0695 |
| 2015/0009888 | A1* | 1/2015 | Pitakdumrongkija | H04B 7/15507 370/315 |
| 2020/0280137 | A1* | 9/2020 | Baek | H01Q 17/005 |

* cited by examiner

REPEATER AND RADIATION PATTERN FORMING METHOD FOR THE SAME

CROSS-REFERENCE TO RELATED PATENT APPLICATION

This application claims priority from the U.S. Provisional Patent Application Ser. No. 62/810,960 filed Feb. 27, 2019 which application is incorporated herein by reference in its entirety.

FIELD OF THE DISCLOSURE

The present disclosure relates to a repeater and a radiation pattern forming method for the same, and more particularly to a repeater and a radiation pattern forming method for the same capable of forming a quasi omni-directional radiation pattern for an antenna array in order to increase a coverage range of signals.

BACKGROUND OF THE DISCLOSURE

In upcoming era of 5th generation mobile networks, both sub-6 GHz and millimeter-wave (mmWave) frequency bands will be used. In order to achieve ubiquitous coverage range of 5G signal for both outdoor and indoor environments, mmWave repeater is a promising candidate that can be massively deployed in downtowns/suburban areas.

While the beam-alignment between gNodeB (gNB) and repeater is relatively easy because of their fixed positions, such a task will become very difficult between repeater and user equipment (UE) due to the lack of synchronization.

In detail, since there is no synchronization between the UE and the repeater, beam-alignment between the UE and the repeater would be very difficult and lack of economic benefit for off-the-shelf products.

Figure 1:
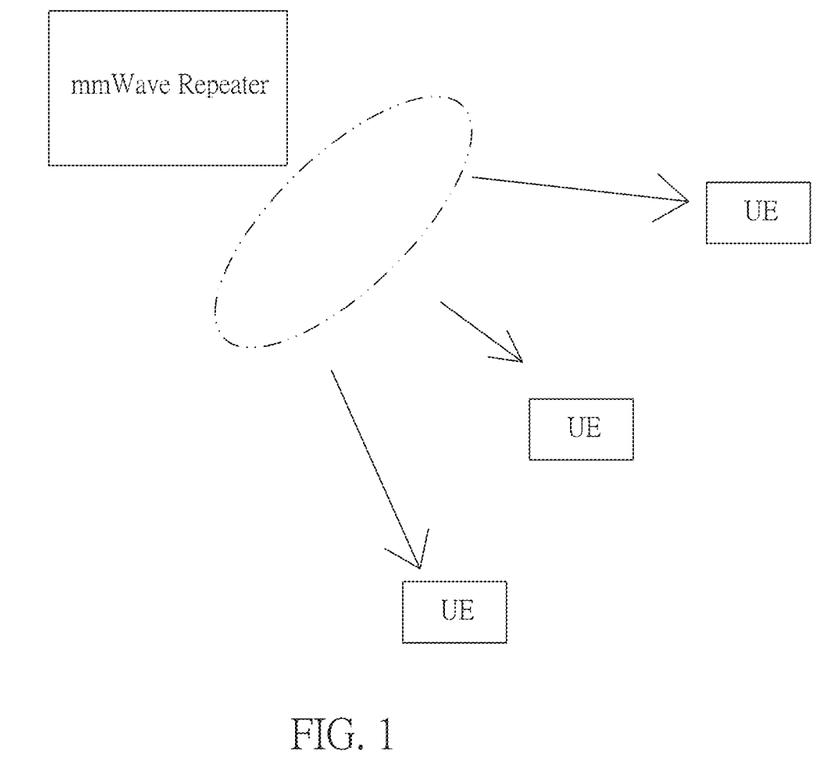
FIG. 1 is a schematic diagram showing an omni-directional radiation pattern implemented by activating only one antenna in the antenna array of an existing repeater.

The simplest way is to activate only one antenna element in an antenna array as shown in FIG. 1, which is a schematic diagram showing an omni-directional radiation pattern implemented by activating only one antenna element in the antenna array of an existing repeater. As can be seen from FIG. 1, an effective isotropic radiated power (EIRP) of such implementation would be quite low since only one power amplifier (PA) is activated, which leads to low signal quality and short communication distance between the repeater and the UEs, such as user equipment UE1, UE2 and UE3 in FIG. 1.

SUMMARY OF THE DISCLOSURE

In response to the above-referenced technical inadequacies, the present disclosure provides a repeater and a radiation pattern forming method for the same capable of forming a quasi omni-directional radiation pattern for an antenna array in order to increase coverage range of signals.

In one aspect, the present disclosure provides a repeater including an up-link circuit and a down link circuit. The up-link circuit is configured to receive first signals from a user equipment, repeat the first signals and transmit the repeated first signals to a base station, respectively. The down link circuit includes a first receiver, a first radio frequency (RF) circuit, and a first transmitter. The first receiver is configured to receive second signals from the base station, the first radio frequency (RF) circuit is configured to repeat the second signals, and the first transmitter is configured to transmit the repeated second signals to the user equipment and includes an antenna array, a plurality of power amplifiers, a plurality of first phase shifters, a first memory unit and a first control logic circuit. The antenna array includes a plurality of antenna elements disposed on a substrate and arranged along a first direction, and a number of the plurality of antenna elements is at least four. The plurality of power amplifiers are connected to the antenna array, and the plurality of first phase shifters are connected between the plurality of power amplifiers and the radio frequency circuit. The first memory unit is configured to store predetermined parameters associated with a predetermined radiation pattern. The first control logic circuit is configured to select a predetermined number of the plurality of power amplifiers and the predetermined number of the plurality of first phase shifters, and control the selected plurality of power amplifiers and the selected plurality of phase shifters according to the predetermined parameters. The first control logic circuit is configured to set, according to the predetermined parameters, normalized gains for the selected plurality of first power amplifiers range from 0.7 to 1 unit to generate the predetermined radiation pattern through the antenna array.

In one aspect, the present disclosure provides a radiation pattern forming method for a repeater including an up-link circuit and a down-link circuit, and the radiation pattern forming method includes the following steps: arranging a plurality of antenna elements of the antenna array along a first direction, and a number of the plurality of antenna elements is at least four; configuring a first memory unit to store a predetermined radiation pattern and predetermined parameters associated with the radiation pattern; configuring a first control logic circuit to select a first number of a plurality of power amplifiers and the first number of a plurality of phase shifters of the down-link circuit, and control the selected plurality of first power amplifiers and the selected plurality of phase shifters according to the predetermined parameters; configuring the first control logic circuit is configured to set, according to the predetermined parameters, normalized gains for the selected plurality of first power amplifiers range from 0.7 to 1 unit to generate the predetermined radiation pattern through the antenna array.

Therefore, the repeater and the radiation pattern forming method for the same provided by the present disclosure provide a complete methodology which assists antenna array system emit signal in a radiation pattern which is broad enough while achieving adequate EIRP, thereby ensuring the quality of connection for both indoor/outdoor applications.

Furthermore, every antenna element in an antenna array is activated, and amplitudes and phases for the antenna elements are optimized to achieve a quasi omni-directional radiation pattern, thereby making the EIRP to be large enough for every corner of surrounded area and enhancing the signal quality, distance of connection for all UEs nearby.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
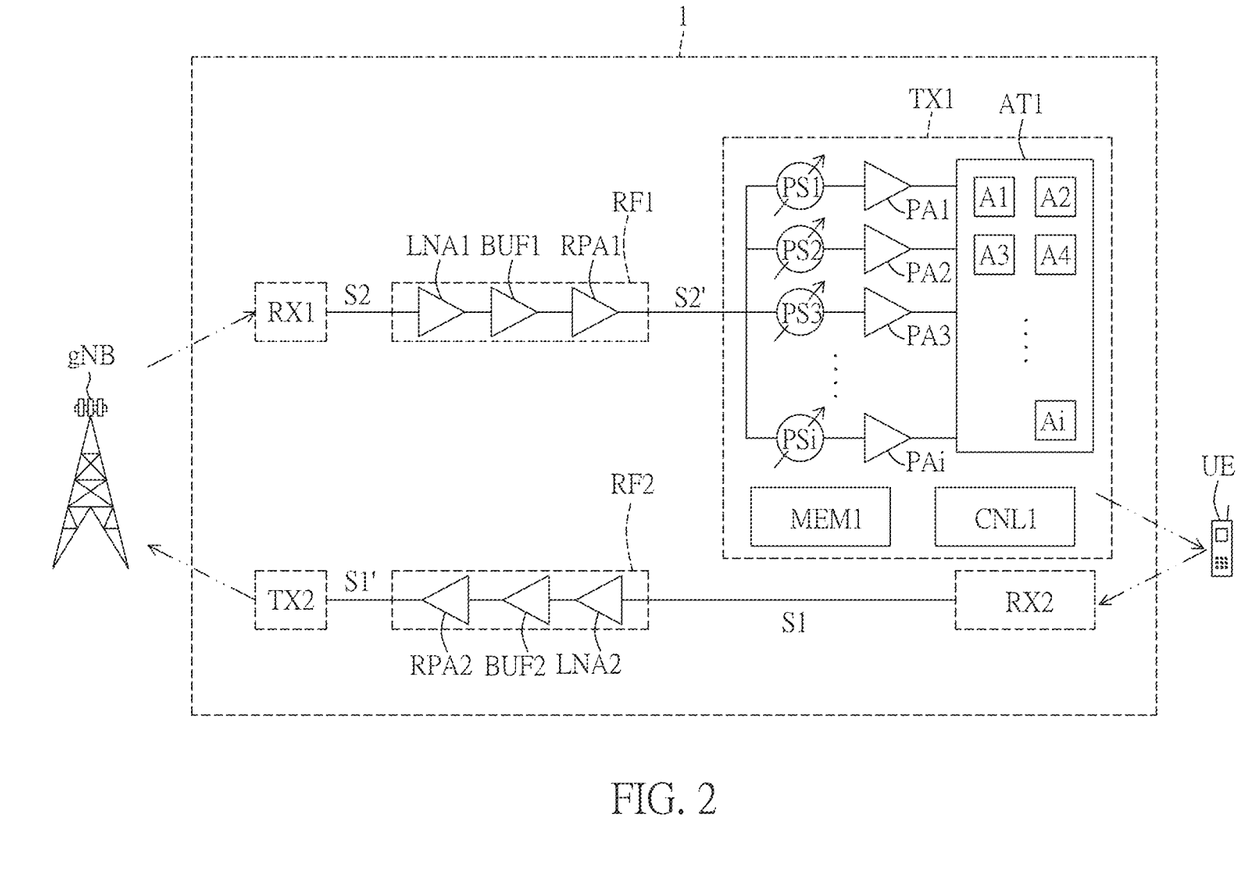
FIG. 2 is a block diagram of a repeater according to an embodiment of the present disclosure.

FIG. 2 is a block diagram of a repeater according to an embodiment of the present disclosure. Referring to FIG. 2, an embodiment of the present disclosure provides a repeater 1 including an up-link circuit UL and a down-link circuit DL.

In certain cases, a direct path of transmission between a base station gNB and a user equipment UE may be blocked by an obstacle, such as a building, which results in a path loss, the repeater 1 can be arranged to provide an alternative path between the base station gNB and the UE, such that the path loss can be reduced.

In telecommunications, the UE can be any terminal and associated equipment located at premises of a subscriber and connected with a telecommunication circuit of a carrier at a demarcation point. The demarcation point is a point established in a building or complex to separate customer equipment from the equipment located in either the distribution infrastructure or central office of the communications service provider. The UE may include various types of terminal equipment to process received signals to thereby enable subscribers to access to the services.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

The repeater 1 is provided for achieving quasi omnidirectional radiation pattern for an antenna array in an mmWave repeater system in order to increase coverage range of signal. In the present embodiment, the up-link circuit UL can be used to receive first signals S1 from the UE, repeat the first signals S1 and transmit the repeated first signals S1' to the base station gNB.

Furthermore, the down-link circuit DL includes a first receiver RX1, a first radio frequency (RF) circuit RF1 and a first transmitter TX1.

The first receiver RX1 is used to receive second signals S2 from the base station gNB, the first RF circuit RF1 is used to repeat the second signals S2, and the first transmitter TX1 is used to transmit the repeated second signals S2' to the UE.

In certain embodiments, the first receiver RX1 can include a receiving antenna array and an antenna controller configured to control the receiving antenna array to receive second signals S2 from the base station gNB.

Furthermore, the first RF circuit RF1 can include a first low noise amplifier LNA1 coupled to the first receiver RX1, a first buffer circuit BUF1 coupled to the first low noise amplifier LNA1, and a first power amplifier RPA1 coupled between the first buffer circuit BUF1 and the first transmitter TX1, thus the first RF circuit RF1 can be used to amplify and repeat the second signals S2 to generate the repeated second signal S2'.

The first transmitter TX1 includes an antenna array AT1, a plurality of first power amplifiers PA1, PA2 . . . , and PAi, a plurality of first phase shifters PS1, PS2 . . . , and PSi, a first memory unit MEM1, and a first control logic circuit CNL1.

Figure 3A:
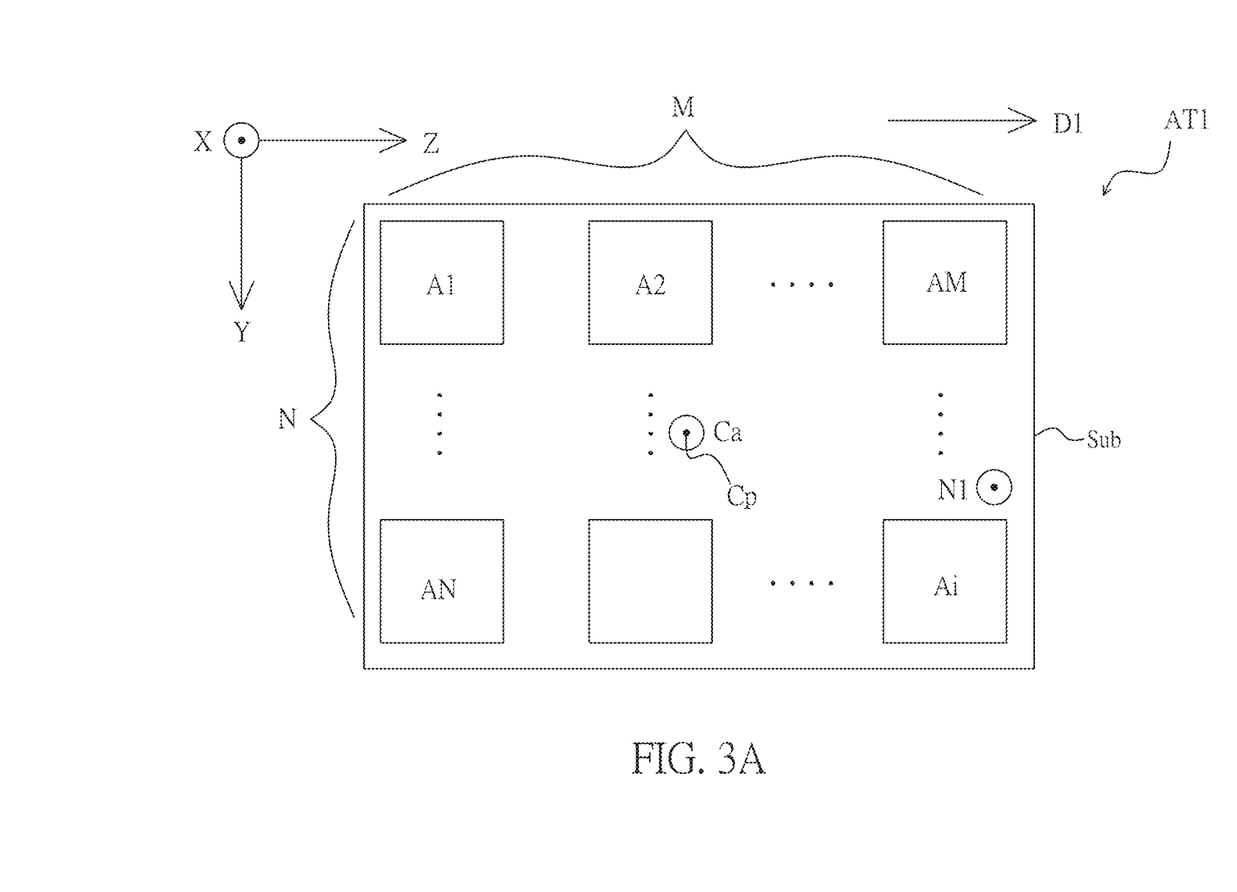
FIG. 3A is a top plan view showing an arrangement of the antenna array of the repeater according to an embodiment of the present disclosure.

Reference is made to FIG. 3A, which is a top plan view showing an arrangement of the antenna array of the repeater according to an embodiment of the present disclosure. The antenna array AT1 can be disposed on a substrate Sub and includes a plurality of antenna elements A1, A2, A3 . . . , Ai arranged along a first direction (e.g., Z axis), and the number of the plurality of antenna elements A1, A2, A3 . . . , Ai can be at least four.

More specifically, the plurality of antenna elements A1, A2, . . . , Ai can be patch antenna elements arranged in a M*N array. That is, M antenna elements, such as antenna elements A1 to AM of the antenna elements A1, A2, . . . , Ai are arranged along a first direction, such as Z axis, and N antenna elements, such as antenna elements A1 to AN of the antenna elements A1, A2, . . . , Ai are arranged along a second direction perpendicular to the first direction, for example, the second direction can be Y axis.

It should be noted that M can be a positive integer equal to or larger than 4, and N can be a positive integer equal to or larger than 1, thereby excluding certain configurations, such as a configuration of 2*2, to be utilized, since a null-point may occur in such configurations and will be explained hereinafter.

Figure 3B:
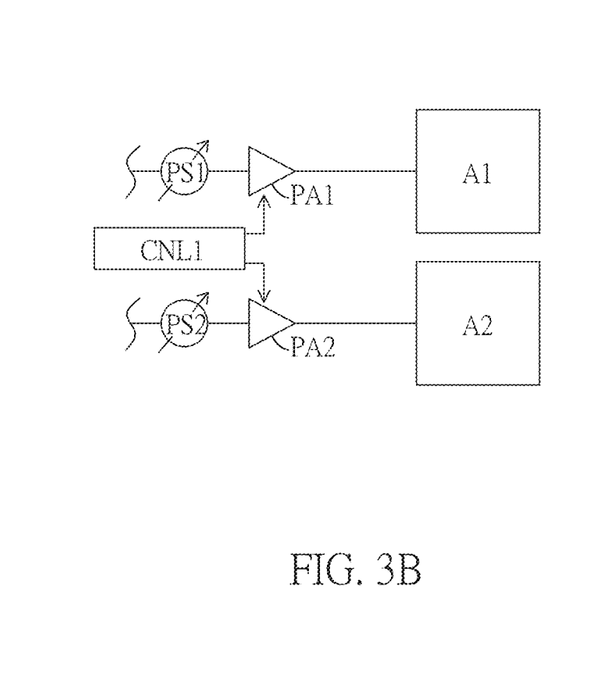
FIGS. 3B and 3C are schematic diagrams showing configurations of single-polarized patch antenna element and dual-polarized patch antenna element according to an embodiment of the present disclosure.
Figure 3C:
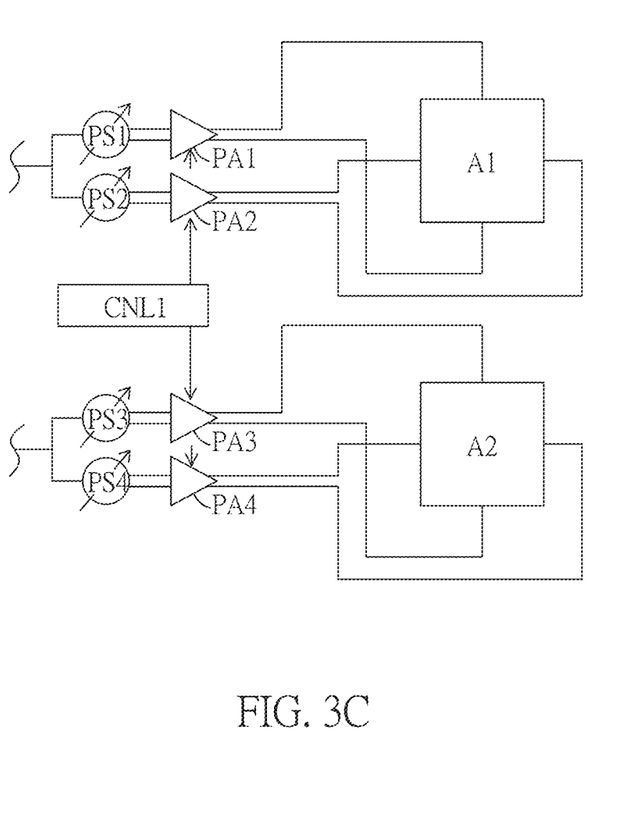

Reference can be further made to FIGS. 3B and 3C, which are schematic diagrams showing configurations of single-polarized patch antenna element and dual-polarized patch antenna element according to an embodiment of the present disclosure. In FIG. 3B, each of the plurality of antenna elements A1 to Ai can be a single-polarized patch antenna elements, and each of the plurality of power amplifiers PA1 to PAi is corresponding to one of the plurality of antenna elements A1 to Ai. For example, the power amplifier PA1 is corresponding to the antenna elements A1 through one feeding point on the antenna element A1, and the power amplifier PA2 is corresponding to the antenna elements A2 through one feeding point on the antenna element A2. It should be noted that the first control logic circuit CNL1 may set normalized gains for all power amplifiers range from 0.7 to 1 unit in the present embodiment.

In FIG. 3C, each of the plurality of antenna elements A1 to Ai can be a dual-polarized antenna element, and each two of the plurality of power amplifiers PA1 to PAi are corresponding to one of the plurality of antenna elements. For example, the power amplifiers PA1 and PA2 are corresponding to the antenna element A1 through different pair of feeding points, and the power amplifiers PA3 and PA4 are corresponding to the antenna element A2 through different pair of feeding points. It should be noted that only one of the power amplifiers PA1 and PA2 can be selected to transmit the repeated second signals S2'. It should be noted that, in the present embodiment, if the plurality of antenna elements A1 to Ai operate in horizontal polarization, the first control logic circuit CNL1 may select and set normalized gains for a predetermined number of the plurality of power amplifiers power amplifiers range from 0.7 to 1 unit. The selected power amplifiers power amplifiers are corresponding to horizontal polarization.

In the present embodiment, the first transmitter TX1 can be an analog beamformer, digital beamformer, and hybrid beamformer, in which the plurality of first power amplifiers PA1, PA2, PA3 . . . PAi are connected to the antenna array AT1, and the plurality of first phase shifters PS1, PS2, . . . PSi are connected between the plurality of first power amplifiers PA1, PA2, PA3 . . . PAi and the first RF circuit RF1.

The first transmitter TX1 further includes the first memory unit MEM1 configured to store predetermined parameters associated with a predetermined radiation pattern, and the first control logic circuit CNL1 configured to select a first number of the plurality of the power amplifiers PA1 to PAi and the corresponding number of the plurality of first phase shifters PS1 to PSi, and control the plurality of first power amplifiers PA1, PA2, PA3 . . . PAi and the plurality of first phase shifters PS1, PS2, . . . PSi according to the predetermined parameters. It should be noted that each one of the power amplifiers can be selected if the antenna elements are single-polarized patch antenna elements, and one of each two power amplifiers corresponding to one antenna elements can be selected if the antenna elements A1 to Ai are dual-polarized patch antenna elements.

In detail, the predetermined parameters are set for generating the predetermined radiation pattern, that is, a quasi omni-directional radiation pattern. The quasi omni-directional radiation pattern is similar to the radiation pattern generated by an antenna with only one activated antenna element, but with broadened radiation pattern and fully activated antenna elements, thereby achieving high signal quality and long communication distance between the UE and the repeater 1.

In the present disclosure, the quasi omni-directional radiation pattern as the predetermined radiation pattern can be specifically defined as a plane having antenna gains range from 2 dB to 5 dB within an angle of 120 degrees with respect to a center axis Ca crossing a center point Cp of the first antenna array AT1 along a normal direction N1 of the substrate Sub, and the plane can be formed by the center axis and an axis along the first direction, e.g., Z-direction. In other words, the plane can be defined as being parallel to X-Z plane and crossing the center point Cp on the substrate Sub.

Furthermore, the first control logic circuit CNL1 can be configured to set, according to the predetermined parameters, normalized gains for the plurality of first power amplifiers range from 0.7 to 1 unit to generate the predetermined radiation pattern, i.e., the quasi omni-directional radiation pattern through the first antenna array AT1 according the predetermined parameters. In more detail, the normalized gains are defined as ratios of gains of the plurality of first power amplifiers PA1, PA2, . . . , PAi to maximum gains thereof.

Taking the antenna array shown in FIG. 3 as an example, the H-plane can be defined as X-Z plane crossing a center point of the first antenna array AT1, the antenna gains can be observed as far-field pattern with respect to a center axis parallel to X axis, and the center axis passes through the center point. The antenna gains for the quasi omni-directional radiation pattern should range from 2 dB to 5 dB within an angle θ of 120 degrees with respect to the center axis of the first antenna array AT1.

Furthermore, for an N-element antenna array, there are 2N parameters, including amplitude parameters and phase parameters for each antenna element in the first antenna array AT1, are adjustable to optimize the radiation pattern of the first antenna array AT1, thereby making an automatic-tuning methodology necessary.

In response to the above-referenced technical inadequacies shown in FIG. 1, for example, the antenna elements A1, A2, . . . , Ai in the first antenna array AT1 are designed to be fully activated, and amplitudes and phases are optimized to implement the quasi omni-directional radiation pattern. Since the first antenna array AT1 is fully activated, gains of the plurality of the first power amplifiers should be larger than 0, so as to increase the EIRP to be large enough for every corner of surrounded area and enhance signal quality and distance of connection for all UEs nearby.

Figure 4:
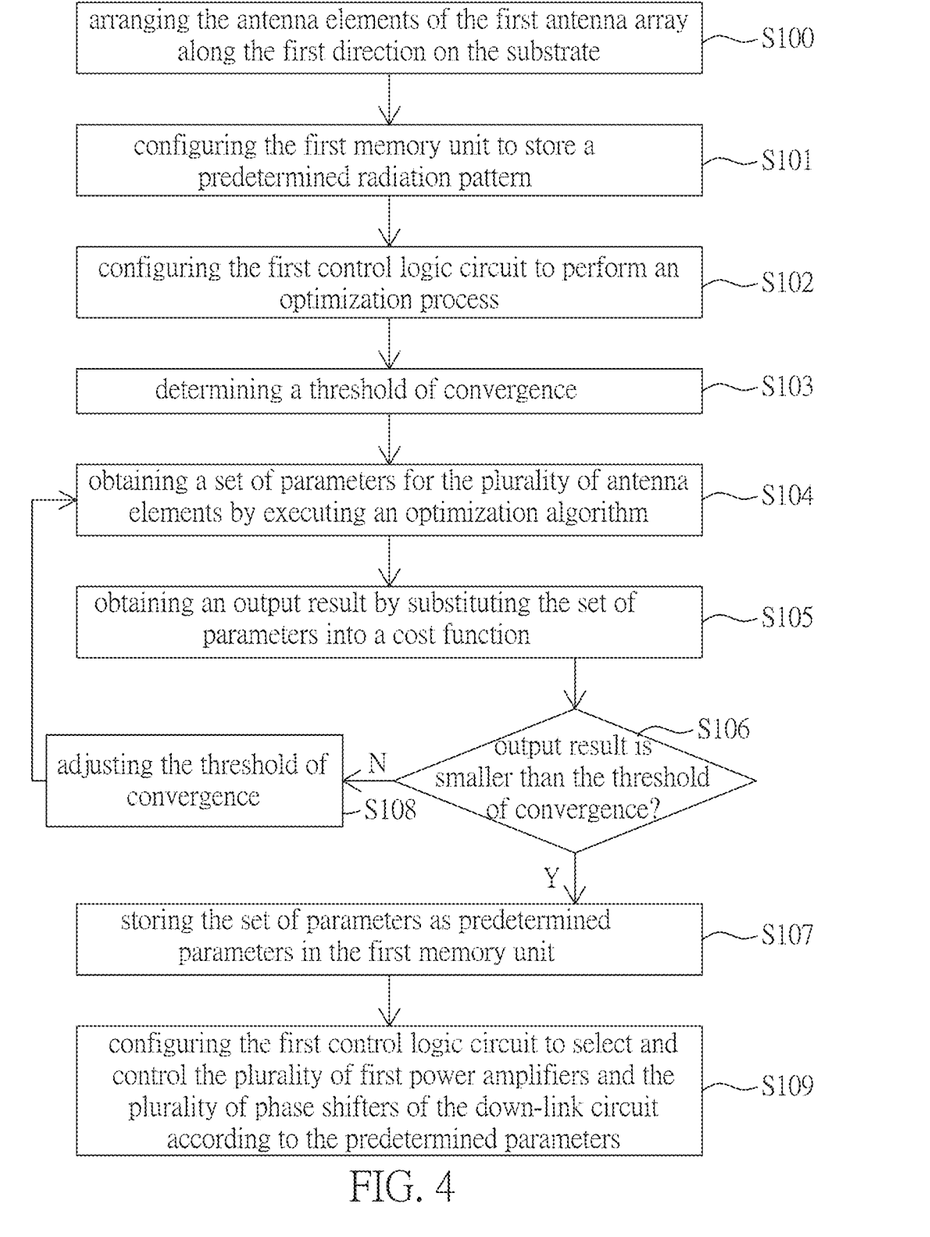
FIG. 4 is a flowchart of the radiation pattern forming method according to an embodiment of the present disclosure.

In this case, the present disclosure provides a radiation pattern forming method for the repeater 1 including the up-link circuit UL and the down-link circuit DL as shown in FIG. 2. As shown in FIG. 4, which is a flowchart of the radiation pattern forming method according to an embodiment of the present disclosure, the radiation pattern forming method can include the following steps:

Step S100: arranging the antenna elements A1, A2, . . . , Ai of the first antenna array AT1 along the first direction on the substrate Sub.

Step S101: configuring the first memory unit MEM1 to store a predetermined radiation pattern. For example, the quasi omni-directional radiation pattern mentioned above can be predefined and stored in the first memory unit MEM1 by a user, and the associated data can include a set of magnetic field data recording a plane having antenna gains range from 2 dB to 5 dB within an angle of 120 degrees with respect to the center axis Ca crossing the center point Cp of the first antenna array AT1 along the normal direction N1 of the substrate. Furthermore, the associated data can also include desired beam width and direction of the predetermined radiation pattern.

Step S102: configuring the first control logic circuit CNL1 to perform an optimization process. In general, the optimization process can be executed on general-purpose computers, such as personal computers, including desktops, notebooks, smartphones and tablets. The optimization process can be performed in certain cases that the first control logic circuit CNL is provided with sufficient performance of calculation. The optimization process can include the following steps:

Step S103: determining a threshold of convergence. For example, the threshold of convergence serves as minimum criteria that a cost function substituted with a set of optimized parameters satisfies.

Step S104: obtaining a set of parameters for the plurality of antenna elements A1, A2, . . . , Ai by executing an optimization algorithm. In detail, the optimization algorithm can be a genetic algorithm (GA). In detail, GA is a commonly used optimization method for the synthesis of antenna array radiation pattern in adaptive beamforming. The problem is to finding phase parameters and amplitude parameters of the antenna elements A1, A2, . . . , Ai that are optimum to provide the quasi omni-directional radiation pattern. The genetic algorithm executed in the present embodiment can include processes of Initialization, Selection, Crossover, and Mutation, and information including the configurations of the first antenna array AT1 (e.g., M*N array with M larger than 4 and N larger than 1), the gains being larger than 0 for the plurality of the first power amplifiers PA1, PA2, . . . , PAi, and the data associating to the quasi omni-directional radiation pattern can be used as references during the processes of GA to obtain a set of optimized parameters for the plurality of antenna elements A1, A2, . . . , Ai.

Step S105: obtaining an output result by substituting the set of parameters into a cost function. In detail, the cost function is used to determine whether the set of parameters satisfies a target threshold of the gain as the threshold of convergence within 120 degrees with respect to the center axis Ca. Errors between gains generated by the set of parameters and the target threshold gain on segments of angles within 120 degrees can be calculated and summed to obtain the output result.

Step S106: determining whether the output result is smaller than the threshold of convergence, in response to the output result being smaller than the threshold of convergence, the method proceeds to step S107: storing the set of parameters as predetermined parameters in the first memory unit MEM1.

In response to the output result being larger than the threshold of convergence determined in step S106, which indicates that the current threshold of convergence may not be achievable, therefore, the method proceeds to step S108: adjusting the threshold of convergence, and the method returns to step S104: obtaining another set of parameters for the plurality of antenna elements A1, A2, . . . , Ai by executing the optimization algorithm, e.g., GA.

After step S107, the method proceeds to step S109: configuring the first control logic circuit CNL1 to select a first number of the plurality of power amplifiers and the first number of the plurality of phase shifters, and control a plurality of first power amplifiers PA1, PA2, . . . PAi and a plurality of first phase shifters PS1, PS2, . . . , PSi of the down-link circuit DL according to the predetermined parameters.

Figure 5A:
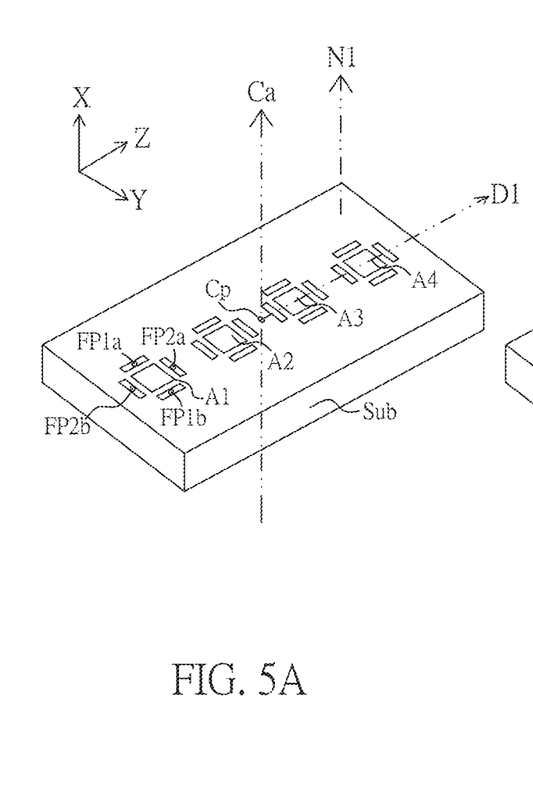
FIGS. 5A, 5B and 5C are schematic diagrams showing configurations of 4*1, 4*2 and 2*2 antenna arrays according to an embodiment of the present disclosure.
Figure 5B:
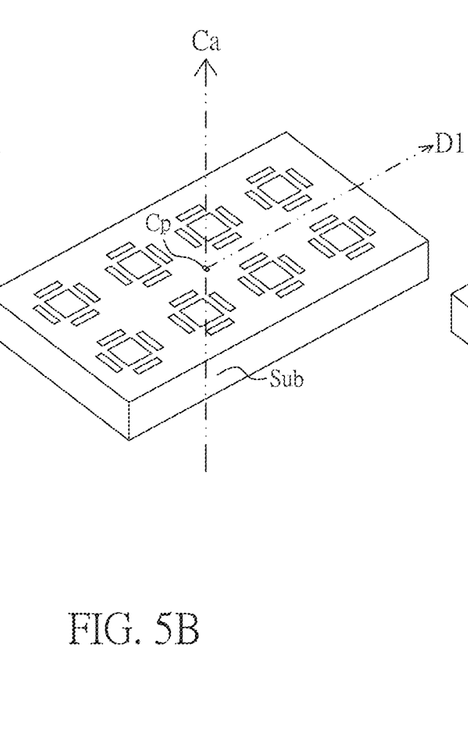
Figure 5C:
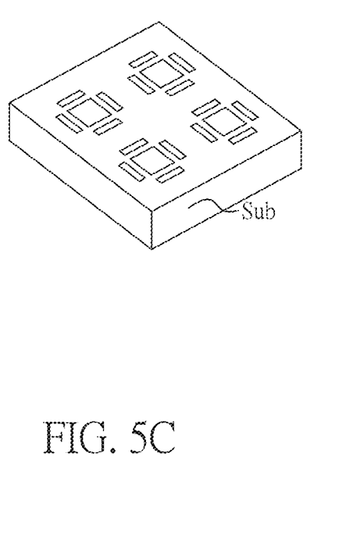

To further demonstrate effectiveness of the radiation pattern optimization method provided by the present disclosure, the method is applied to a 4*1 antenna array, a 4*2 antenna array and a 2*2 antenna array. Reference can be made to FIGS. 5A, 5B and 5C, which are schematic diagrams showing configurations of 4*1, 4*2 and 2*2 antenna arrays according to an embodiment of the present disclosure.

As shown in FIGS. 5A to 5C, the plurality of antenna elements A1 through A4 are dual-polarized antenna elements arranged along the first direction D1 and disposed on the substrate Sub (e.g., PCB), and each of the antenna elements A1 through A4 includes at least two feeding points. For example, the antenna element A1 includes first feeding points FP1a and FP1b and second feeding points FP2a and FP2b for receiving differential signals. It should be noted that the single-polarized patch antenna elements shown in FIG. 3B can be utilized, and at least one feeding point can be provided on each of the antenna elements A1 to Ai, the present disclosure is not limited thereto.

The differential signals can be fed to the first feeding points FP1a and FP1b and the second feeding points FP2a and FP2b depending on types of polarization of the antenna element A1. The antenna elements A1 through A4 can be configured to be switch between a first polarization (e.g., the signals are fed to the first feeding point FP1a or FP1b) and a second polarization (e.g., the signals are fed to the second feeding point FP2a or FP2b) orthogonal to the first polarization.

Further, after the configurations are applied by the radiation pattern optimization method provided by the present disclosure, coverage ranges of quasi omni-directional radiation patterns generated by the 4*1, 4*2 and 2*2 antenna arrays are compared. Reference is made to FIGS. 6A to 6D, which are gain patterns of the 4*1 antenna array (6A), 4*2 antenna array (6B), 2*2 antenna array (6C), and an antenna array with only single activated antenna element according to an embodiment of the present disclosure. The gain patterns are obtained from a plane within an angle of 180 degrees with respect to the center axis Ca crossing the center point Cp of the first antenna array AT1 along the normal direction N1 of the substrate Sub, and the plane can be formed by the center axis Ca and an axis along the first direction D1.

Figure 6A:
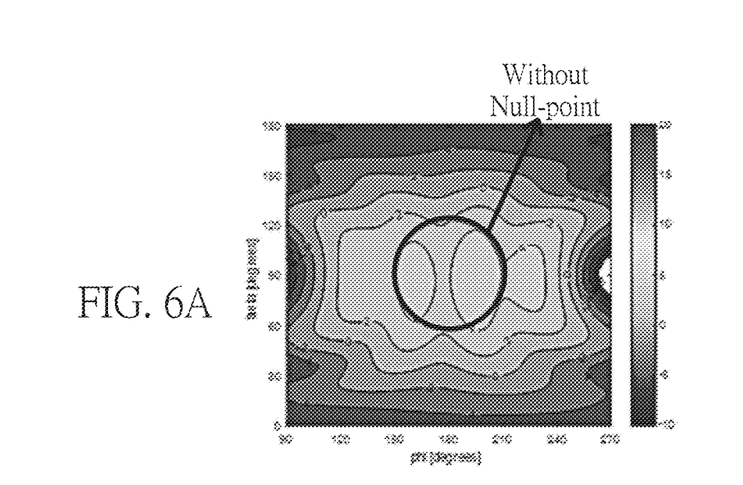
FIGS. 6A to 6D are gain patterns of the 4*1 antenna array (6A), 4*2 antenna array (6B), 2*2 antenna array (6C), and an antenna array with only single activated antenna element according to an embodiment of the present disclosure.
Figure 6B:
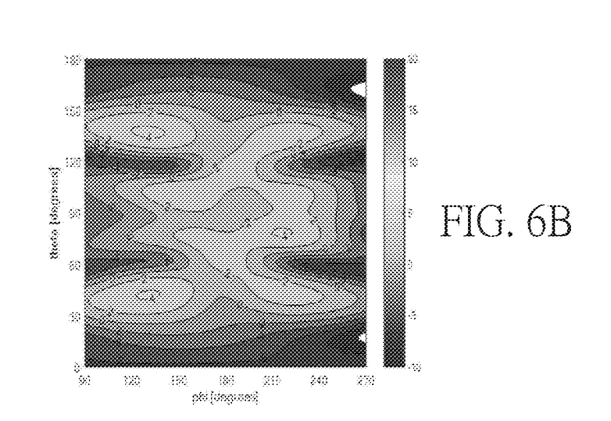
Figure 6C:
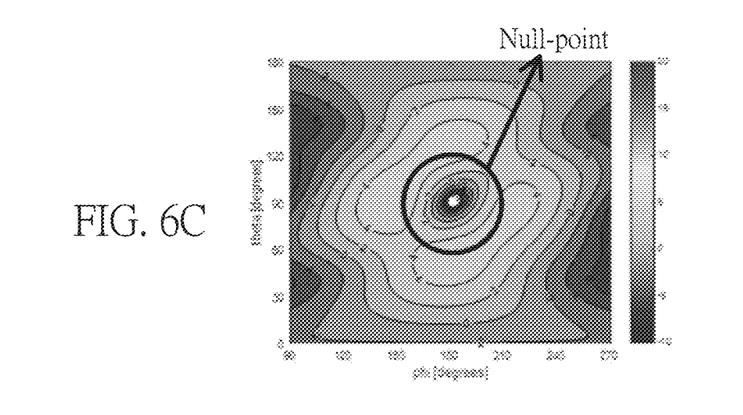
Figure 6D:
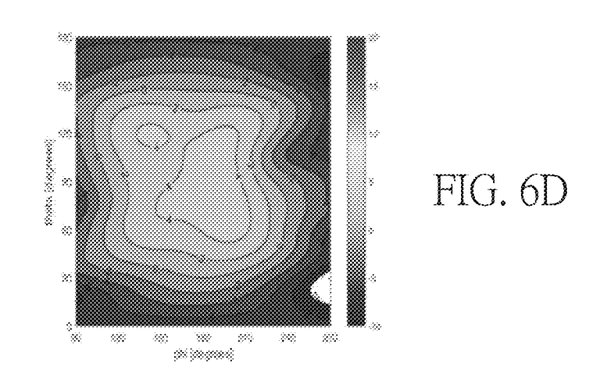

As can be seen from the figures, it is very clear that the coverage ranges of the quasi omni-directional radiation patterns of the 4*1 antenna array and 4*2 antenna array are very similar to the case of the antenna array with single activated antenna element.

However, there is a null-point occurred in the radiation pattern generated by the 2*2 antenna array after being applied by the radiation pattern optimization method provided by the present disclosure. Comparing with the quasi omni-directional radiation pattern without any null-point generated by the 4*1 antenna array and 4*2 antenna array, it is realized that the 2*2 antenna array should be excluded, thereby establishing a limitation of M being a positive integer equal to or larger than 4 and N being a positive integer equal to or larger than 1 in the M*N antenna array.

Figure 7:
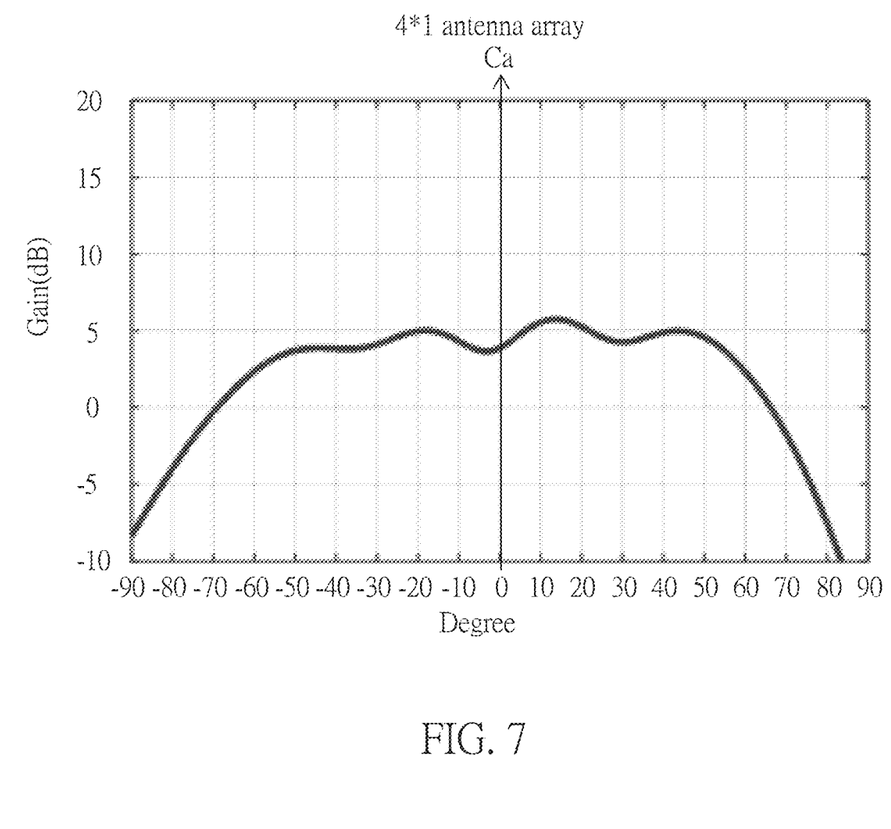
FIG. 7 is a gain pattern of H-plane observed as far-field pattern with respect to a center axis of the 4*1 antenna array according to an embodiment of the present disclosure.

Reference can be further made to FIG. 7, which is a gain pattern of H-plane observed as far-field pattern with respect to a center axis of the 4*1 antenna array according to an embodiment of the present disclosure. As shown in FIG. 7, antenna gains is shown to be within a range of 2 dB to 5 dB within an angle of 120 degrees with respect to the center axis Ca crossing the center point Cp along the normal direction N1 of the substrate Sub, that is, from 60 to −60 degrees, which complies with the definition of the quasi omni-directional radiation pattern provided by the present disclosure.

Figure 8:
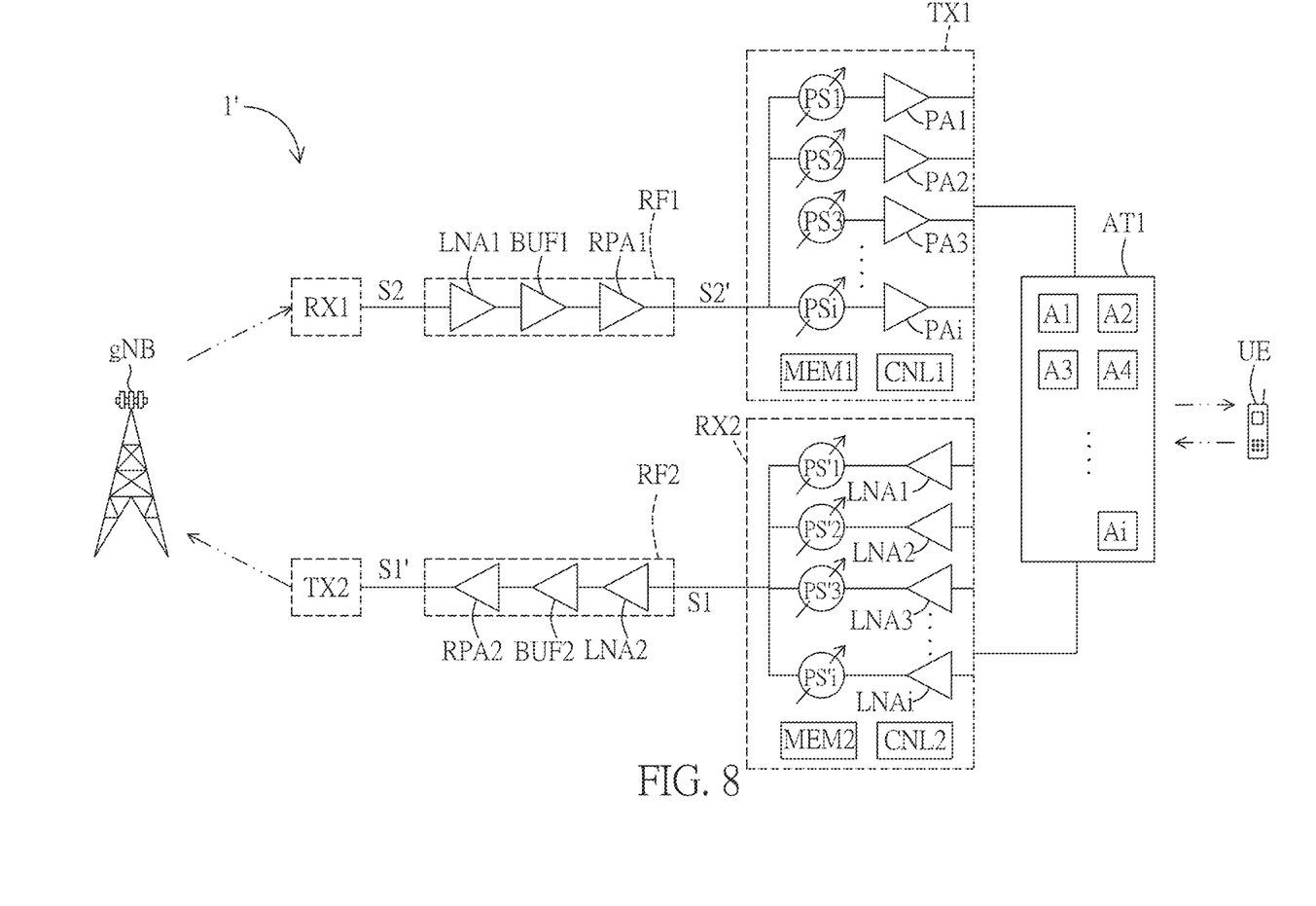
FIG. 8 is a block diagram of a repeater according to another embodiment of the present disclosure.

FIG. 8 is a block diagram of a repeater according to another embodiment of the present disclosure. Referring to FIG. 8, an embodiment of the present disclosure provides a repeater 1' including an up-link circuit UL and a down-link circuit DL.

The difference from the previous embodiment of FIG. 2 is that the first transmitter TX1 and the second receiver RX2 share the first antenna array AT1 for transmitting the repeated signals and receiving signals for the UE. In this case, the second receiver RX2 can include a second memory unit MEM2, a second control logic circuit CNL2, a plurality of second phase shifters PS'1, PS'2, . . . , PS'I and a plurality of low noise amplifiers LNA1, LNA2, . . . , LNAi.

Similarly, the second memory unit MEM2 is configured to store predetermined parameters associated with another set of predetermined radiation pattern, i.e., the quasi omni-directional radiation pattern, and the second control logic circuit CNL2 is configured to control the plurality of low noise amplifiers LNA1, LNA2, . . . , LNAi and the plurality of phase shifters PS1, PS2, . . . PSi according to the another set predetermined parameters. It should be noted that the another set of predetermined parameters can be as the same as the set of the predetermined parameters obtained by the radiation pattern optimization method provided by the present disclosure, and the repeated descriptions are omitted.

As mentioned in the previous embodiments, the first antenna array AT1 is designed to be fully activated, and thus gains of the plurality of the second power amplifiers PA'1, PA'2, . . . , PA'i are set to be larger than 0, so as to increase the EIRP to be large enough for every corner of surrounded area and enhance signal quality and distance of connection for all UEs nearby.

Although the first antenna array AT1 is shown to be shared by the first transmitter TX1 and the second receiver RX2, but the present disclosure is not limited thereto. The second receiver RX2 can include another antenna array similar to the first antenna array AT1, and the corresponding predetermined parameters can be obtained accordingly, thereby generating the quasi omni-directional radiation pattern as mentioned above.

In conclusion, the repeater and the radiation pattern optimization method for the same provided by the present disclosure provide a complete methodology which assists antenna array system emit signal in a radiation pattern which is broad enough while achieving adequate EIRP, thereby ensuring the quality of connection for both indoor/outdoor applications.

Furthermore, every antenna element in an antenna array is activated, and amplitudes and phases for the antenna elements are optimized to achieve a quasi omni-directional radiation pattern, thereby making the EIRP to be large enough for every corner of surrounded area and enhancing the signal quality, distance of connection for all UEs nearby.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A repeater, comprising:
   an up-link circuit configured to receive first signals from a user equipment, repeat the first signals and transmit the repeated first signals to a base station, respectively; and
   a down link circuit, including:
     a first receiver configured to receive second signals from the base station; and
     a first radio frequency (RF) circuit configured to repeat the second signals;
     a first transmitter configured to transmit the repeated second signals to the user equipment and including:
       an antenna array, including a plurality of antenna elements disposed on a substrate and arranged along a first direction, wherein a number of the plurality of antenna elements is at least four;
       a plurality of power amplifiers connected to the antenna array;
       a plurality of first phase shifters connected between the plurality of power amplifiers and the radio frequency circuit;
       a first memory unit configured to store predetermined parameters associated with a predetermined radiation pattern; and
       a first control logic circuit configured to select a predetermined number of the plurality of power amplifiers and the predetermined number of the plurality of first phase shifters, and control the selected plurality of power amplifiers and the selected plurality of phase shifters according to the predetermined parameters,
   wherein the first control logic circuit is configured to set, according to the predetermined parameters, normalized gains for the selected plurality of first power amplifiers range from 0.7 to 1 unit to generate the predetermined radiation pattern through the antenna array.

2. The repeater according to claim 1, wherein each of the plurality of antenna elements is a single-polarized patch antenna elements and each of the plurality of power amplifiers is corresponding to one of the plurality of antenna elements.

3. The repeater according to claim 1, wherein each of the plurality of antenna elements is a dual-polarized antenna element, and each two of the plurality of power amplifiers is corresponding to one of the plurality of antenna elements.

4. The repeater according to claim 1, wherein the predetermined radiation pattern is defined as a plane having antenna gains range from 2 dB to 5 dB within an angle of 120 degrees with respect to a center axis crossing a center point of the antenna array along a normal direction of the substrate, and the plane is formed by the center axis and an axis along the first direction.

5. The repeater according to claim 1, wherein the normalized gains are ratios of gains of the plurality of power amplifiers to maximum gains thereof.

6. The repeater according to claim 1, wherein M antenna elements of the antenna elements are arranged along the first direction and N antenna elements of the antenna elements are arranged along a second direction perpendicular to the first direction.

7. The repeater according to claim 6, wherein M is a positive integer equal to or larger than 4, and N is a positive integer equal to or larger than 1.

8. The repeater according to claim 1, wherein the uplink circuit includes a second receiver configured to receive third signals from the user equipment and including:
 a plurality of second phase shifters;
 a plurality of low noise amplifiers connected between the plurality of second phase shifters and the antenna array;
 a second memory unit configured to store the predetermined parameters associated with the predetermined radiation pattern; and
 a second control logic configured to select a second number of the plurality of low noise amplifiers and the second number of the plurality of second phase shifters, and control the selected plurality of low noise amplifiers and the selected plurality of second phase shifters according to the predetermined parameters.

9. A radiation pattern forming method for a repeater including an up-link circuit and a down-link circuit, the radiation pattern forming method comprising the following steps:
 arranging a plurality of antenna elements of the antenna array along a first direction, wherein a number of the plurality of antenna elements is at least four;
 configuring a first memory unit to store a predetermined radiation pattern and predetermined parameters associated with the radiation pattern;
 configuring a first control logic circuit to select a first number of a plurality of power amplifiers and the first number of a plurality of phase shifters of the down-link circuit, and control the selected plurality of first power amplifiers and the selected plurality of phase shifters according to the predetermined parameters;
 configuring the first control logic circuit is configured to set, according to the predetermined parameters, normalized gains for the selected plurality of first power amplifiers range from 0.7 to 1 unit to generate the predetermined radiation pattern through the antenna array.

10. The radiation pattern optimization method according to claim 9, wherein each of the plurality of antenna elements is a single-polarized patch antenna elements and each of the selected plurality of power amplifiers is corresponding to one of the plurality of antenna elements.

11. The radiation pattern forming method according to claim 9, wherein each of the plurality of antenna elements is a dual-polarized antenna element and each two of the plurality of power amplifiers is corresponding to one of the plurality of antenna elements.

12. The radiation pattern forming method according to claim 9, wherein the predetermined radiation pattern is defined as a plane having antenna gains range from 2 dB to 5 dB within an angle of 120 degrees with respect to a center axis crossing a center point of the antenna array, and the plane is formed by the center axis and an axis along the first direction.

13. The radiation pattern forming method according to claim 9, wherein the normalized gains are ratios of the gains of the plurality of power amplifiers to maximum gains thereof.

14. The radiation pattern forming method according to claim 9, wherein M antenna elements of the plurality of antenna elements are arranged along the first direction and N antenna elements of the plurality of antenna elements are arranged along a second direction perpendicular to the first direction.

15. The radiation pattern forming method according to claim 14, wherein M is a positive integer equal to or larger than 4, and N is a positive integer equal to or larger than 1.

16. The radiation pattern forming method according to claim 9, further comprising:
 configuring a second receiver of an uplink circuit of the repeater to receive third signals from the user equipment;
 configuring a second memory unit of the second receiver to store the predetermined parameters associated with the predetermined radiation pattern;
 configuring a second control logic of the uplink circuit to select, according to the predetermined parameters, a second number of a plurality of low noise amplifiers of the second receiver and the second number of the plurality of second phase shifters of the second receiver, and control the selected plurality of low noise amplifiers and the selected plurality of second phase shifters according to the predetermined parameters.

17. The radiation pattern forming method according to claim 9, further comprising:
 configuring the first control logic circuit to perform an optimization process, which includes the following steps:
 determining a threshold of convergence;
 obtaining a set of parameters for the plurality of antenna elements by executing an optimization algorithm;
 obtaining an output result by substituting the set of parameters into a cost function; and
 determining whether the output result is smaller than the threshold of convergence, if the output result is determined to be smaller than the threshold of convergence, storing the set of parameters as the predetermined parameters in the first memory unit.

18. The radiation pattern optimization method according to claim 17, wherein the optimization algorithm is a genetic algorithm.

19. The radiation pattern forming method according to claim 17, wherein if the of amplitudes and phases are determined not to be smaller than the threshold of convergence, the optimization process further includes adjusting the threshold of convergence and returning to a step of obtaining another set of parameters for the plurality of antenna elements by executing the optimization algorithm.

* * * * *